United States Patent [19]
Derossi

[11] 3,734,253
[45] May 22, 1973

[54] OVERLOAD APPLIED NO-BACK BRAKES

[76] Inventor: Piero Derossi, 55 Corso Giovanni Lanza, Torino, Italy

[22] Filed: Feb. 17, 1971

[21] Appl. No.: 116,022

[30] Foreign Application Priority Data

Mar. 7, 1970  Italy.............................67774 A/70

[52] U.S. Cl..........................192/8 C, 192/7, 188/134
[51] Int. Cl. ..............................................B60t 7/12
[58] Field of Search ...........................192/7, 8 C, 8 R

[56] References Cited

UNITED STATES PATENTS

| | | | |
|---|---|---|---|
| 3,499,511 | 3/1970 | Bouhot | 192/7 |
| 3,034,619 | 5/1962 | Glasgow et al. | 192/7 |
| 3,367,456 | 2/1968 | Bohnhoff | 192/7 X |
| 3,596,740 | 8/1971 | Nav | 192/8 R X |
| 2,946,417 | 7/1960 | Hungerford | 192/8 C |
| 3,329,242 | 7/1967 | Minarick et al. | 192/7 X |

*Primary Examiner*—Benjamin W. Wyche
*Attorney*—Young & Thompson

[57] ABSTRACT

A device intended for transmitting from a driving shaft to a driven member, in a bi-directional and non-reversible way, a limited torque, wherein said driven member, rotatably mounted on the driving shaft, is braked at rest by a bi-directional logarithmic brake, suppression means provide for suppressing the braking action upon rotation of the driving shaft, a torsion balance is provided for transmitting a torque under angular displacement from the driving shaft to the driven member, and reinstatement means reinstate said braking action when said angular displacement overcomes a pre-determined limit angle.

7 Claims, 3 Drawing Figures

Patented May 22, 1973 3,734,253

INVENTOR
PIERO DEROSSI
BY Young & Thompson
ATTORNEYS

OVERLOAD APPLIED NO-BACK BRAKES

BACKGROUND OF THE INVENTION

This invention relates to a device intended for transmitting from a driving shaft to a driven member, in a bi-directional and non-reversible way, a torque to be limited to a pre-determined amount.

In some technical cases there is need for driving the rotation in both directions of a driven member, from a driving shaft whereat an over-abundant torque is available, which shaft on its turn, when not driven, should not be rotatable by action of said member. Moreover, it is necessary that, in case of said driven member being overloaded, it cannot be damaged by the great torque which can be applied by the driving shaft. For avoiding unnecessary and expensive over-dimensioning of the driven member, it is therefore required that the torque, which the driving shaft can apply to the driven member, be limited to a predetermined amount, sufficient for the normal drive but not sufficient for damaging the driving member in case of accidental stopping or overloading thereof.

An example of such requirements may be found in aircraft, wherein a driving shaft controls, through some gears, several winches for moving, for example, the ailerons or other movable surfaces. Up today, in such cases, a complete solution of said requirements has been found by inserting in the shafting of each driven member two separate devices, the one for making the drive non-reversible, this first device being for instance a socalled bi-directional logarithmic brake, and the other capable of limiting to a pre-determined amount the transmissible torque, this second device being one of the different kinds of torque limiting couplings, available in the technics. Said need for two separate devices makes the shafting complicated and increases the weight and the need for space, which particularly in aircraft appliances is a serious disadvantage.

BRIEF SUMMARY OF THE INVENTION

This invention has the object of providing a single and compact device, having reduced size and weight, capable of correctly accomplishing both the functions of rendering the driven non-reversible in both directions of rotation, and of limiting to a pre-determined limit amount the transmissible torque by stopping the driving shaft if said pre-determined limit torque is overcome in relation to a driven member, without said driven member being damaged by an excessive torque applied by the driving shaft.

This object is attained, according to the invention, by connection of said driven member to a bi-directional logarithmic brake whose action normally maintains the driving member braked with respect to fixed members in both directions of rotation; between said driving shaft and said driven member being inserted means for suppressing said braking action when said shaft is in driving condition, thus allowing the driven member to follow the movement transmitted by the driving shaft; and between said driving shaft and said logarithmic brake being further inserted means for re-establishing the said braking action when the amount of the transmitted torque overcomes a predetermined value. For this purpose, the amount of the transmitted torque is measured as an angular displacement between the driving shaft and the driven member, by means of a torsion balance inserted between said component parts.

BRIEF DESCRIPTION OF THE DRAWINGS

This invention will appear more clearly by reading the following specification, drawn up with reference to a non-limiting example of embodiment, diagrammatically shown in the annexed drawing, wherein.

DETAILED DESCRIPTION

Figure 1:
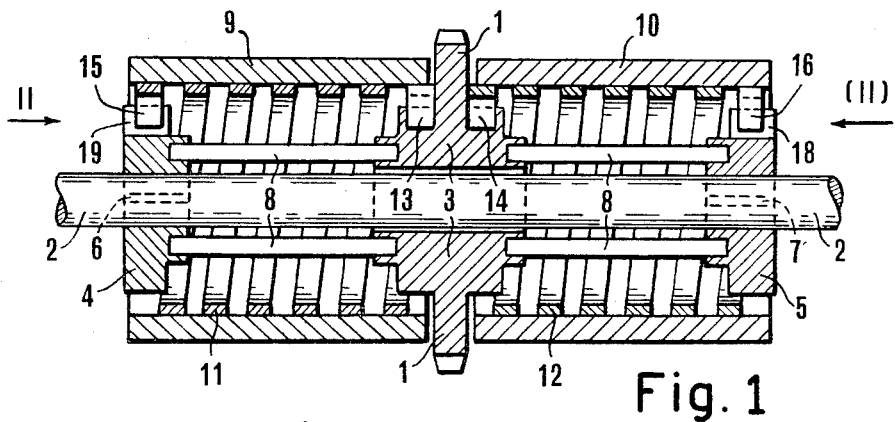
FIG. 1 shows a diagrammatical representation of a longitudinal section of the device according to the invention.

As shown in FIG. 1, the driven member 1 has the shape of a toothed wheel free rotatably mounted on the driving shaft 2. The toothed wheel 1 may be connected, in a non-represented way, to any device to be driven. Two sleeves 4 and 5 are keyed, for instance by means of keys 6 and 7, on the driving shaft 2, and between the sleeves 4,5 and the hub 3 of the driven wheel 1 there is a torsion balance which, according to FIG. 1, comprises flexion blades 8 whose first end is fitted in the hub 3 of the driven wheel, whilst the second end thereof is fitted in one of said sleeves 4 and 5 solid with the driving shaft 2. Thanks to said torsion balance, when a torque is transmitted by the driving shaft 2 to the driven wheel 1, said wheel is angularly displaced with respect to the shaft, and this angular displacement depends in a known manner on, for example it is proportional to, the transmitted torque.

Coaxial with the driving shaft 2 on both sides of the driven wheel 1 are fixedly mounted two tubular shells 9 and 10, and in each of said tubular shells is inserted, with a small previous contraction load, a helical spring, respectively 11, 12, both helical springs 11 and 12 being wound in the same direction. The inner ends 13 and 14 of the helical springs 11 and 12, adjacent to the driven wheel 1, are connected in a solid way or eventually with a certain play to the wheel 1 or to the hub 3 thereof.

The helical springs 11 and 12 connected to the driven wheel 1 and the tubular shells 9 and 10 wherein the helical springs are mounted, form a well known so-called bi-directional logarithmic brake, and by the action thereof the driven wheel 1 is braked in both directions of rotation. In effect, if the wheel 1 is driven to rotate in one or the other direction, one or the other of the springs 11 and 12 does not hinder the rotation since it tends to wind, but the remaining spring tends to unwind and to jib against the corresponding fixed tubular shell 9 or 10, so that the wheel 1 is prevented from rotating in both directions.

The outer end of both the helical springs 11 and 12, opposed to the inner ends 13 and 14 connected to the driven wheel 1, are provided with engagement members 15 and 16. On the other hand, both the sleeves 4 and 5 keyed on the driving shaft 2 are provided with engagement surfaces, respectively 17 and 18, intended for co-operating with the engagement members 15 and 16 of springs 11 and 12 in the winding direction of said springs, but said engagement surfaces 17 and 18, at rest, are spaced through a little angle *a* from said engagement members 15 and 16 respectively.

Figure 2:
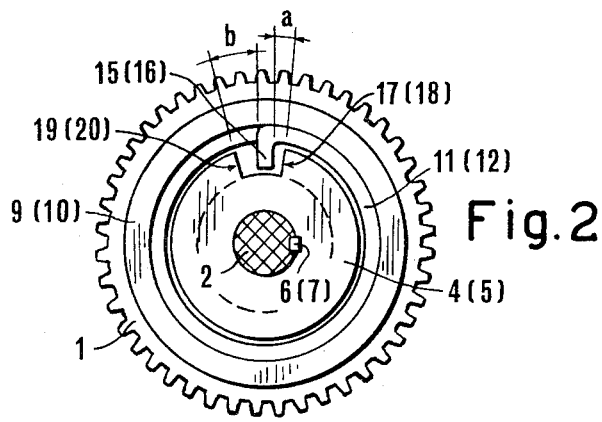
FIG.2 is an axial view thereof according to the arrows II and (II) of FIG.1.

All arrangements on both sides of the driven wheel 1 are entirely symmetric, and therefore FIG.2 may be assumed as a view according to arrow II of FIG. 1 or even as a view according to the opposed arrow (II) of the same FIG. 1. In the first case the reference numbers without brackets should be considered, and in the second case on the contrary are valid the reference numbers provided with brackets. The references 1 of the wheel, 2 of the shaft, and those having reference to the angles, which all are shown without brackets, are valid in both cases.

When the driving shaft 2 is standing, the presence of the engagement members 15,16 of the springs 11,12, and of the engagement surfaces 17,18 of the sleeves 4,5 does not modify the braked condition of the driven wheel 1, said engagement members and surfaces being spaced apart the ones from the others. But, when the driving shaft 2 rotates, the said component parts provide for suppressing the braking action of the logarithmic brake in the concerned direction of rotation. In effect, when the rotation of shaft 2 starts, the driven wheel 1 initially remains braked, but the rotation of the shaft is not prevented thanks to the yielding of the torsion balance 8 inserted between the shaft 2 and the wheel 1. When the rotation of the driving shaft 2 with respect to the unmoved wheel 1 attains the angle *a*, the engagement surface 17 of the sleeve 4 contacts the engagement member 15 of the spring 11 (or, in the opposite direction of rotation, the engagement surface 18 of the sleeve 5 contacts the engagement member 16 of the spring 12) which contacted spring is the one which actually brakes the wheel 1. After said contact has taken place, the engagement surface of the concerned sleeve pushes, through the contacted engagement member, the braking spring in the winding direction, thus suppressing its braking action and allowing rotation in the concerned direction of the wheel 1, which is pulled by the shaft 2 through the torsion balance 8. The angular displacement of the driven wheel 1 with respect to the driving shaft 2 during rotation corresponds, according to the characteristics of the torsion balance 8, to the transmitted torque, but its minimum value is that of the angle *a* to which corresponds a resistant torque $C_a$. During the rotation thus obtained of the driven wheel 1 due to the winding action applied to the braking spring 12 (or respectively 11), the opposite spring 11 (or respectively 12), or course, does not brake since it is driven in its own winding direction.

Besides the engagement surfaces 17 and 18, the sleeves 4,5 have contact surfaces 19,20 respectively, intended for co-operating with the engagement members 15 and 16 of springs 11 and 12 in the unwinding direction of said springs. The contact surfaces 19 and 20, at rest, are spaced through an angle *b* from said engagement members 15 and 16 respectively. Said angle *b* is considerably greater than the already discussed angle *a*, nd, more precisely, it is selected such as to correspond, in view of the characteristics of the torsion balance 8, to the maximum torque $C_b$ whose transmission should be allowed. The torque $C_b$ should, therefore, be greater than the maximum torque needed for normal operation of the driven member, and smaller than the safety limit torque considered in designing the driven member.

Since, as stated, the angle *b* is in all cases chosen greater than the angle *a*, in normal operation the present of the contact surfaces 19,20 does not modify the above specified behavior of the device. In effect, the angle of rotation *a* required for providing contact of the engagement members and surfaces 15,17 or respectively 16,18 in view of suppressing the braking action exerted by the springs 11,12 upon the driven member 1, is not sufficient for providing contact of the engagement members and contact surfaces 15,19 or respectively 16,20, which therefore in normal operation remain always spaced apart.

As already stated, the driving shaft 2 trails the driven member 1 with an angular displacement corresponding, according to the characteristics of the torsion balance 8, to the transmitted torque. If, due to a seizure, hindrance or other cause of abnormal resistance, or even to an accidental positive stopping, the resistant torque of the driven member attains the stated limit amount $C_b$, the angular displacement between the driven member 1 and the driving shaft 2 attains the angle *b* and the engagement member and contact surfaces 15,19 (or, according to the direction of rotation, 16,20) contact the one another. From this moment the spring 11 (or respectively 12) is driven through said contacting component parts in unwinding direction and brakes against the correspondent tubular shell 9 (or respectively 10) thus discharging on said fixed shell the excess torque available at the driving shaft 2 even, if needed, up to stopping the shaft, without the torque transmitted to the driven member 1 overcoming the pre-determined limit amount.

It is to be noted that, assuming for example a sinistrorsal direction of rotation as viewed according to the arrow 11 of FIG. 1, the suppression of the braking action at starting movement is effected by action of the sleeve 4 on spring 11, whilst the following reinstatement of the braking action due to excessive torque is effected by action of the other sleeve 5 on spring 12, and vice-versa.

The springs 11,12 contribute (though in a very reduced amount) to the torque transmission from the driving shaft to the driven member. Therefore, it is to be understood that the characteristics of the torsion balance, as previously taken in consideration, should include the contribution of said springs to the torque transmission.

As already stated, the connection of the springs 11;12 to the driven member 1 or its hub 3 may be solid or even it may show a limited play. If a play is provided, it is to be understood that all previously explained actions take place without any change after an initiaL limited rotation of the driven member, sufficient for compensation for said play.

Of course, in a form of embodiment such as that of FIGS. 1 and 2, the braking or stopping action, effected due to the excess of torque transmitted to the driven member, ceases when for whatever reason the resistant torque of the driven member is reduced anew to an amount smaller than the pre-determined safety limit.

In some cases, however, it is suitable or even it is needed that once the drive has bee stopped for excess of torque, it should remain stopped until an opposite rotation is imparted to the driving shaft. Such a requirement may be satisfied by a form of embodiment according to FIG.3. Therein, the same reference numbers already employed show component parts having the same or like functions of these described with reference to FIGS. 1 and 2.

The arrangement of two fixed tubular shells 9,10 is the same of the preceding example, but in this case they may be enclosed in a common outer tubular shell 21 since the driven wheel 1 has, in this case, a diameter lesser than the tubular shells 9,10. The toothed wheel 1 may mesh with an outer toothed wheel, not shown, through a window 22 in the outer shell 21. Between each of the tubular shells 9,10 and the driving shaft 2, which last in this case is also tubular, are provided ball bearings 23. The sleeve 4 is integral with the driving shaft 2; the arrangement of the sleeve 5, of the hub 3 of the toothed wheel 1, and of the helical springs 11,12 is the same as in the preceding example.

The torsion balance, which in the preceding example was inserted between the hub 3 and both the sleeves 4,5, is provided here only between the hub 3 and the sleeve 4. This torsion balance, instead of comprising a yieldable direct connection provided by the flexion blades 8 between said hub and sleeve, comprises a coupling with inclined surfaces. A ring 24 is mounted on a grooved portion 25 of the driving shaft 2 for axial movement thereon without the possibility of rotating with respect to said shaft. A compression spring 26 is inserted between said ring 24 and the sleeve 4, for resiliently pushing the ring 24 towards the hub 3 of the driven wheel 1. The ring 24 and the hub 3 contact the one another along corresponding inclined helical surfaces 27. These contacting helical surfaces turn the axial force applied by the compression spring 26 into a torque applied to the driven wheel, thus forming a torsion balance.

A non-linear characteristic of this torsion balance is preferably obtained by giving to a portion 28 of said inclined helical surfaces a considerably increased inclination. In this way it may be obtained that the initial torque $Ca$ needed for producing the angular displacement through the angle $a$ by very reduced, whilst maintaining within a reduced amount the angle $b$ corresponding to the safety limit torque $Cb$.

Corresponding steps 29 are provided at the end, opposite to the portion 27, of said portion 28 having an increased inclination of the helical surface of ring 24, and between the two differently inclined portions 27 and 28 of the helical surface of the hub 3. When the angular displacement between driven member 1 and driving shaft 2 attains the pre-determined amount for stopping the drive, both steps 29 become to mutually correspond and release in engagement, thus stopping the drive and further avoiding the return to transmission condition even when the resistant torque, for whatever reason, decreases. The transmission may be reinstated, in this case, only by imparting to the driving shaft 2 a rotation in a direction opposite the preceding one during which the drive has been stopped. Then the two steps 29 disengage reciprocally and the device returns to its initial condition of torque transmission.

Figure 3:
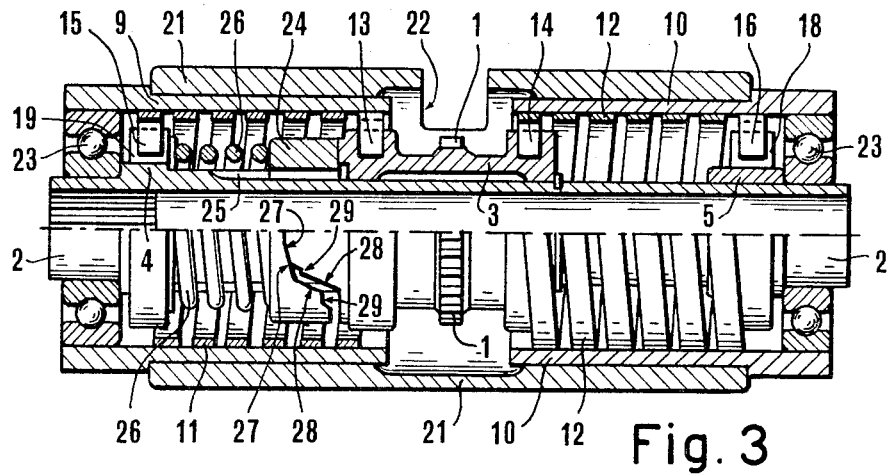
FIG.3 is a representation, similar to that of FIG.1, of a modified form intended for satisfying to particular requirements, the view of this figure being completely sectional above the central axis, whilst some component parts only are sectional beneath said axis.

The described arrangement of the inclined surfaces 27,28 and of the steps 29 is effective, of course, in a single direction of rotation. For obtaining the same operation in the opposite direction of rotation, a similar arrangement is required, wherein said surfaces 27, 28 have opposite inclination. Such arrangement is represented in FIG.3 by the same drawing lines 27 to 29 assumed as viewed in transparence through the driving shaft 2.

In practice, other identical inclined surfaces may be provided, diametrally opposite the ones described, with the purpose of balancing the resulting efforts, without any change in operation.

It is understood that the torsion balance 8 or 24-29 may be embodied in many different forms and arrangements, and so the sleeves 4,5, their engagement surfaces 17,18 and contact surfaces 19,20 as well as the keying means 6,7. Also the arrangement of the helical springs 11,12 with respect to the driven member 1 may be modified, and forms of embodiment may be imagined, wherein a single helical spring is employed for forming the bi-directional logarithmic brake, the engagement members provided at its ends co-operating in this case both with engagement surfaces of the driven member and of the driving shaft for obtaining the desired operation.

Having thus described my invention, what I claim is:

1. A device intended for transmitting from a driving shaft to a driven member, in a bi-directional and nonreversible way, a torque to be limited to a predetermined amount, comprising a driving shaft, a driven member rotatably mounted on said driving shaft, a bi-directional logarithmic brake connected to said driven member for braking said driven member in both directions of rotation, said logarithmic brake comprising a pair of fixed tubular shells mounted coaxially with said driving shaft on both sides of said driven member, and a pair of helical springs, said helical springs being both wound in the same direction, each helical spring being inserted with a small previous contraction load within one of said fixed tubular shells, the inner ends of said helical springs adjacent to said driven member being connected to said driven member, suppression means connected to said driving shaft and to said bi-directional logarithmic brake for suppressing the braking action of said bi-directional logarithmic brake upon rotation of the driving shaft, a torsion balance connected to said driving shaft and to said driven member for transmitting a torque from said driving shaft to said driven member and for producing an angular displacement between said driving shaft and said driven member depending upon the transmitted torque, and reinstatement means connected to said driving shaft and to said bi-directional logarithmic brake for reinstating said braking action upon angular displacement of said driving shaft with respect of said driven member overcoming a limit angle, said limit angle being chosen so as to correspond, according to the transmission characteristic of said torsion balance, to the maximum torque to which the transmitted torque is to be limited.

2. A device as set forth in claim 1, wherein the outer ends of said helical springs, opposite said inner ends connected to said driven member, have engagement members, and said driving shaft carrier, in vicinity of said engagement members, engagement surfaces for co-operating with said engagement members in the winding directions of the respective helical springs, between said co-operating engagement members and engagement surfaces being provided at rest a small angular space, said engagement members and engagement surfaces forming said suppression means.

3. A device as set forth in claim 1, wherein the outer ends of said helical springs, opposite said inner ends connected to said driven member, have engagement members, and said driving shaft carries, in vicinity of said engagement members, engagement surfaces for co-operating with said engagement members in the winding directions of the respective helical springs, between said co-operating engagement members and engagement surfaces being provided at rest a small angular space, said engagement members and engagement surface forming said suppression means, said driving shaft further carrying, in vicinity of said engagement members, contact surfaces for co-operating with said engagement members in the unwinding directions of the respective helical springs, between said co-operating engagement members and contact surfaces being provided at rest a second angular space, said second angular space being greater than said small angular space provided between said engagement members and engagement surfaces, and said second angular space corresponding, according to the transmission characteristic of said torsion balance, to the maximum torque to which the transmitted torque is to be limited.

4. A device as set fort in claim 3, wherein said driving shaft is provided with sleeves carrying said engagement surfaces and contact surfaces, said driven member has a hub, and said torsion balance is connected to said hub and at at least one of said sleeves.

5. A device as set forth in claim 1, wherein said driving shaft has a grooved portion and carries at least a sleeve, said driven member has a hub, and wherein said torsion balance comprises a ring mounted on said grooved portion of the driving shaft for axial movement thereon without the possibility of rotating with respect to said driving shaft, a compression spring mounted on said driving shaft between said sleeve and said ring for pushing said ring towards said hub, and mutually contacting inclined surfaces provided on said hub and on said ring for turning the axial force applied by said compression spring into a torque applied to said hub and to the driven member connected therewith.

6. A device as set forth in claim 1, wherein said driving shaft has a grooved portion and carries at least a sleeve, said driven member has a hub, and wherein said torsion balance comprises a ring mounted on said grooved portion of the driving shaft for axial movement thereon without the possibility of rotating with respect to said driving shaft, a compression spring mounted on said driving shaft between said sleeve and said ring for pushing said ring toward said hub, and mutually contacting inclined surfaces provided on said hub and on said ring for turning the axial force applied by said compression spring into a torque applied to said hub and to the driven member connected therewith, each one of said inclined surfaces comprising a first portion and a second portion having an inclination greater than said first portion, for providing a non-linear characteristic of said torsion balance.

7. A device as set forth in claim 1, wherein said driving shaft has a grooved portion and carries at least a sleeve, said driven member has a hub, and wherein said torsion balance comprises a ring mounted on said grooved portion of the driving shaft for axial movement thereon without the possibility of rotating with respect to said driving shaft, a compression spring mounted on said driving shaft between said sleeve and said ring for pushing said ring towards said hub, an mutually contacting inclined surfaces provided on said hub and on said ring for turning the axial force applied by said compression spring into a torque applied to said hub and to the driven member connected therewith, said inclined surfaces having steps intended for mutually corresponding and releasing in engagement upon angular displacement of said driving shaft with respect of said driven member overcoming said limit angle, whereby the drive is then stopped and its return to transmission condition is avoided until to the driving shaft is imparted an opposite rotation.

* * * * *